Patented Dec. 25, 1951

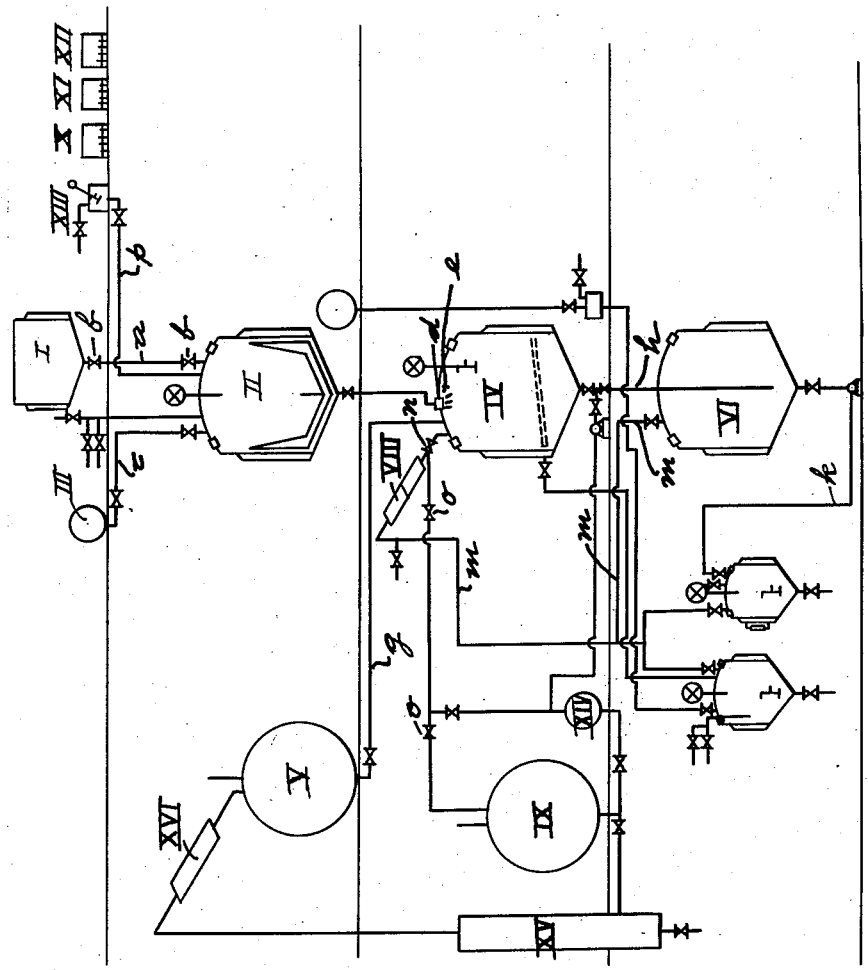

2,579,986

UNITED STATES PATENT OFFICE 2,579,986

LANOLIN ALCOHOLS FROM WOOL GREASE

Peter Vaterrodt, Rutherford, and Robert E. Choyce, Passaic, N. J., assignors to Botany Mills, Inc., Passaic, N. J., a corporation of New Jersey Application February 3, 1950, Serial No. 142,192

4 Claims. (Cl. 260—397.2)

The object of the present invention is to provide an integrated process for the treatment of wool grease in such manner as to separate the lanolin alcohols therefrom by steps which will greatly reduce the time and cost of production, and which will result in improved products.

The characteristic of our process is that the procedure is such as to eliminate the use of high pressure equipment, saponification is effected by substantially anhydrous caustic, saponification is accelerated by a catalyst, calcium soaps are formed which enable the employment of a solvent for the lanolin alcohols which will be neutral to the calcium soaps, the calcium soaps themselves are neutralized before they are subjected to the solvent, and they are put into special form for such purpose, i. e. in the form of filaments which are almost instantaneously dissolved.

These and other characteristics of the process will be described with reference to the accompanying drawing in which The drawing shows a schematic layout of suitable elements for carrying the process into effect.

Referring to the drawing, we have shown at I the lower section of a supply tank for raw wool grease which may be of one thousand gallons capacity, for example. The wool grease is led by pipe $a$, the latter being controlled by valves $b$, to a reactor II which may be one thousand gallons capacity. The reactor II is steam-jacketed and the wool grease therein is thereby raised in temperature, preferably to 240° F. As the temperature of the wool grease is raised, 240 lbs. of caustic soda are dissolved in 10.9 gallons of water and led into reactor II. Saponification of the wool grease is then carried out, as for example within two hours. Thereupon 244 lbs. of calcium chloride are dissolved in 6.8 gallons of water, preferably with a suitable anti-foaming material, and the solution passed into the said reactor II. The conversion of the sodium soaps to the calcium soaps may be completed within one hour.

The calcium soaps are then neutralized by the addition of a solution consisting of 65.5 lbs. of sodium bisulphate dissolved in 4.13 gallons of water. The neutralization may be completed within one hour.

As a step added to the above, saponification is accelerated by the addition of 3.02 gallons of isopropanol to each batch of 3,000 lbs. of raw wool grease led into the reactor II. Isopropanol may be present during the action of the caustic soda and added to reactor II from tank III via valve-controlled pipe $c$. Primary and secondary alcohols, such as ethyl alcohol n.propylalcohol, etc. may be used in lieu of isopropanol in the process, but isopropanol has special advantages and is preferred.

After the conversion of the sodium soaps to the calcium soaps and neuralization of the latter, the low pressure in the reactor II (which generally will be about one atmosphere, i. e. 15 lbs. gauge pressure) is released and vacuum is applied to the reactor for removal of water from the saponified material.

The "dried" material is then sprayed in filament form into the extractor IV, the pipe $d$ diagrammatically showing at $e$ spray nozzles for this purpose. The filaments may be of any suitable gauge, and it is desired that they be sufficiently fine to have extremely rapid solution by the solvent in extractor IV. This solvent may be of the class of ketones, although alcohols, chlorinated hydrocarbons and aromatic hydrocarbons may be used.

By reason of the form in which the saponified calcium-converted and neutralized material is introduced into the solvent, and by reason of the very rapid extraction therefrom of the lanolin alcohols, the calcium soaps precipitate as a light flocculent material which can be readily washed out of the extractor IV by hot water.

The solvent may be led to extractor IV from tank V via valve-controlled pipe $g$.

The lanolin alcohol solution is led from extractor IV to distillation kettle VI, which may be via valve-controlled pipe $h$. The distillation kettle may be steam-jacketed, and distillation may be continued until the concentration of lanolin alcohol is as desired. After such distillation, the concentrated solvent miscella of lanolin alcohols may be vacuum-dried. Thereupon, or while the lanolin alcohols are still in the presence of some solvent, bleaching may be effected with hydrogen peroxide, or other bleach.

Solvent may be recycled through the extractor IV by continuous distillation and condensation. Thus the solvent vapors from distillation kettle VI may be led through valve-controlled pipe $m$ to condenser VIII, and thence into the extractor IV. By closing, or partly closing, valve $n$ and opening valve $o$, the condensate or part thereof may be led to the wet solvent tank IX. The tanks X, XI and XII are for the supply of caustic soda, calcium chloride and sodium bisulphate.

At XIII is indicated a chemical mixing tank which may discharge through valve-controlled pipe $p$ into reactor II. Tank XIV is a very wet acetone tank which may be of 500-gallon capacity, and the member shown at XV is a rectifier which discharges into condenser XVI leading to the rectified solvent tank V.

The method above described is a marked improvement over known processes. Saponification is effected by caustic aqueous solutions which approach the anhydrous. We prefer a caustic content of 85% in the aqueous solution, although the caustic content range can be 75-85%. Low pressure is employed, with corresponding low temperature, and the latter can be about 240° F. This low temperature insures a light-colored product, and the equipment is of low cost as compared with high pressure equipment. Only one solvent is required, and hence, only one rectifying column is needed, solvent storage tanks also being reduced in number. The novel method of introducing the calcium soaps into the solvent by forming the soaps into filaments, as by spraying or jet injection, enables almost instantaneous solution of the lanolin alcohol and the precipitation of the calcium soaps as light flocculent materials which can be removed from the reacting kettle with ease by a simple hot water washing step.

The formation of diacetone alcohol, when acetone is the solvent, is prevented by neutralization of the calcium soaps before they are filament-sprayed into the solvent. Formation of diacetone alcohol has heretofore constituted a problem because of its side reactions, its removal from the products being exceedingly difficult.

The solvent employed is preferably a ketone, as, for example, acetone, although alcohols, chlorinated hydrocarbons and aromatic hydrocarbons may be used.

Having described our invention, what we claim and desire to secure by Letters Patent is as follows:

1. A process for recovering lanolin alcohols from wool grease which consists in saponifying the wool grease by caustic alkali solution having a caustic alkali content of about 75% to about 85% at pressure not substantially exceeding one atmosphere, converting the product to calcium soaps carrying said alcohols, and neutralizing the soaps, then drying the neutralized calcium soaps, extracting the lanolin alcohols from the neutralized calcium soaps by solvent action and precipitation of the calcium soaps in light flocculent form from a solution of the lanolin alcohols, thence removing solvent from said alcohols.

2. A process for recovering lanolin alcohols from wool grease by caustic solution having a caustic content of 75-85%, in accordance with claim 1, in combination with the step of saponifying the wool grease in the presence of an alcohol selected from the group consisting of a primary and secondary-alcohol as a catalyst, and at a temperature not substantially above 240° F.

3. A process for recovering lanolin alcohols from wool grease which consists in saponifying the wool grease by caustic alkali solution having a caustic alkali content of about 75% to about 85%, converting the resulting soap product to calcium soaps carrying said alcohols, neutralizing the soaps, then drying the neutralized soaps, extracting the lanolin alcohols by feeding the neutralized calcium soaps with their content of lanolin alcohols, in filament form, into a solvent for the lanolin alcohols, then removing solvent from said alcohols.

4. A process in recovering lanolin alcohols from wool grease, in accordance with claim 1, in which the saponification of the wool grease is effected in the presence of isopropanol in proportion from 0.2% to 0.5% of the weight of the wool grease.

PETER VATERRODT.
ROBERT E. CHOYCE.

REFERENCES CITED

The following references are of record in the file of this patent:

UNITED STATES PATENTS

| Number | Name | Date |
| --- | --- | --- |
| 2,191,260 | Porsche et al. | Feb. 20, 1940 |
| 2,245,538 | Thurman | June 10, 1941 |
| 2,302,679 | Drekter et al. | Nov. 24, 1942 |

OTHER REFERENCES

Hackh's Chemical Dictionary, 3rd edition, 1944, The Blakiston Company.